United States Patent [19]

Jones et al.

[11] Patent Number: 5,289,936
[45] Date of Patent: Mar. 1, 1994

[54] PLASTIC BASKET

[75] Inventors: Ronald J. Jones, Muskogee; Lonnie W. Wright, Broken Arrow, both of Okla.

[73] Assignee: UNR Industires, Inc., Chicago, Ill.

[21] Appl. No.: 33,235

[22] Filed: Mar. 16, 1993

Related U.S. Application Data

[63] Continuation of Ser. No. 848,755, Mar. 10, 1992, Pat. No. 5,255,930.

[51] Int. Cl.⁵ .......................... B65D 6/02; B65D 6/26
[52] U.S. Cl. ................................. 220/4.28; 220/676; 280/33.992; 280/33.991
[58] Field of Search ...................... 280/33.991, 33.992, 280/33.995, 33.996, 33.997, 47.26, 47.31, 47.34, 79.2, 79.3; 220/4.28, 4.33, 4.34, 666, 668, 676; 403/361, 381, 382; 296/901

[56] References Cited

U.S. PATENT DOCUMENTS

| | | |
|---|---|---|
| 2,689,134 | 9/1954 | Lachance . |
| 3,341,060 | 9/1967 | Rehrig et al. . |
| 3,410,441 | 11/1968 | Rhyne ............................ 220/4.28 |
| 3,999,774 | 12/1976 | Rehrig . |
| 4,046,394 | 9/1977 | Thompson, Jr. . |
| 4,123,077 | 10/1978 | Joseph . |
| 4,165,003 | 8/1979 | Drader . |
| 4,173,287 | 11/1979 | Kumakawa ................ 220/4.28 X |
| 4,238,044 | 12/1980 | Roddier . |
| 4,268,049 | 5/1981 | Salvador . |
| 4,273,346 | 6/1981 | Rehrig . |
| 4,482,074 | 11/1984 | Lalley . |
| 4,537,413 | 8/1985 | Rehrig . |
| 4,625,879 | 12/1986 | Liu . |
| 4,632,411 | 12/1986 | Badger . |
| 4,650,199 | 3/1987 | Rehrig . |
| 4,664,283 | 5/1987 | Liu ................................ 220/4.28 |
| 4,865,338 | 9/1989 | Rehrig . |
| 4,895,267 | 1/1990 | Karlsson . |
| 4,917,255 | 4/1990 | Foy et al. . |
| 4,946,059 | 8/1990 | Rehrig . |
| 5,111,604 | 5/1992 | Rehrig . |

FOREIGN PATENT DOCUMENTS

3903265A1 7/1989 Fed. Rep. of Germany .
2181097A 4/1987 United Kingdom .

Primary Examiner—Brian L. Johnson
Attorney, Agent, or Firm—Dressler, Goldsmith, Shore & Milnamow, Ltd.

[57] ABSTRACT

A shopping cart comprises a wheeled chassis, a handle structure including two handle uprights, and a plastic basket comprising separate side, front, and bottom panel members molded from a suitable plastic and assembled without any need for an interior frame. The side and front panel members have tabs. The front and bottom panel members have slots. The tabs are received by the slots to assemble the panel members. A rim wire has side portions received by wire-receiving formations of near top edge portions of the side panel members and a bight portion bearing against a top edge portion of the front panel member. The side portions are bent to form prongs inserted into apertures in the handle uprights to position the basket before the basket is fastened to the handle uprights and to the wheeled chassis.

7 Claims, 9 Drawing Sheets

PLASTIC BASKET

This application is a continuation of application Ser. No. 07/848,755, filed Mar. 10, 1992 and now U.S. Pat. No. 5,255,930.

TECHNICAL FIELD OF THE INVENTION

This invention pertains to a shopping cart comprising a wheeled chassis, a handle structure, and a plastic basket of an improved construction. The plastic basket comprises separate side, front, and bottom panel members molded from a suitable plastic and assembled without any need for an interior frame.

BACKGROUND OF THE INVENTION

A shopping cart of a type in widespread use in supermarkets, drug stores, hardware stores, and other retail establishments comprises a wheeled chassis, a handle structure, and a basket. Commonly, the basket has fixed side, front, and bottom panel members and a pivotable back, which can be upwardly pivoted to permit one cart to nest within another. Although it is common for the basket to be wholly or predominantly made from welded wire components, it is known for the basket to have molded plastic panel members, which are preferred by some retailers.

As exemplified in Rehrig U.S. Pat. No. 3,999,774, it is known for a plastic basket for a shopping cart of the type noted above to comprise a single, molded part defining two side panel members, a front panel member, and a bottom panel member. A multi-panel part can be quite expensive to mold. It can be quite difficult to maintain dimensional tolerances when molding such a part.

Joseph U.S. Pat. No. 4,123,077 discloses, in a shopping cart of the same type, i basket comprising an interior framework and plastic side, front, and bottom panel members, which may be separately molded, and which are attached to the interior framework. The use of an interior framework adds to the complexity and overall manufacturing cost of the shopping cart.

It would be highly desirable to construct a basket for a shopping cart of the type noted above from plastic side, front, and bottom panel members that could be separately molded and that could be easily assembled without any need for an interior framework for the basket.

SUMMARY OF THE INVENTION

According to a first aspect of this invention, a shopping cart comprises a wheeled chassis, a handle structure, and a basket of an improved construction. The basket is fastened to the wheeled chassis and to the handle structure. The basket comprises separate panel members molded from a plastic material and including two side panel members, a front panel member, and a bottom panel member. One or more of the side, front, and bottom panel members have tabs thereon. One or more of the same panel members have slots therein. The tabs are received by the slots to assemble the panel members having the tabs and the panel members having the slots.

Preferably, the tabs include tabs on side edges of the front panel member and tabs on bottom edges of the side panel members, and the slots include slots in the bottom panel member receiving the tabs on the bottom edges of the side panel members and slots in the front edges of the side panel members receiving the tabs on side edges of the front panel member. Preferably, the tabs also include tabs on a bottom edge of the front panel member, and the slots also include slots in the bottom panel member receiving the tabs on the bottom edge of the front panel member. Accordingly, the tabs are received by the slots to assemble the side, front, and bottom panel members.

In a preferred construction, each side panel member has a top edge portion having a wire-receiving formation extending therealong, and the basket further comprises a rim wire. The rim wire has two side portions and a bight portion connecting the side portions. The side portions are received by the wire-receiving formations. The bight portion bears against a top edge portion of the front panel member.

Preferably, the wire-receiving formations comprise outwardly opening channels and inwardly opening channels. The inwardly opening channels alternate with the outwardly opening channels along the top edge portions of the side panel members.

According to a second aspect of this invention, a shopping cart comprises a wheeled chassis, a handle structure including two handle uprights extending from the wheeled chassis, and a basket of a similar or different construction. The basket comprises molded plastic panel members including two side panel members, a front panel member, and a bottom panel member, which may be separate panel members, as described above. Two prongs extend backwardly from the top side panel members into apertures in the handle uprights for positioning the basket relative to the handle uprights prior to fastening the basket to the wheeled chassis or to the handle uprights. Rivets, screws, or other fasteners are provided for fastening the basket to the wheeled chassis and to the handle uprights.

Advantageously, if the rim wire described above is used, the side portions of the rim wire may extend backwardly from back edges of the side panel members to define the prongs. Preferably, where they extend backwardly therefrom, the side portions of the rim wire are bent to define the prongs.

These and other objects, features, and advantages of this invention are evident from the following description of a preferred embodiment of this invention with reference to the accompanying drawings.

DETAILED DESCRIPTION OF PREFERRED EMBODIMENT

Figure 1:
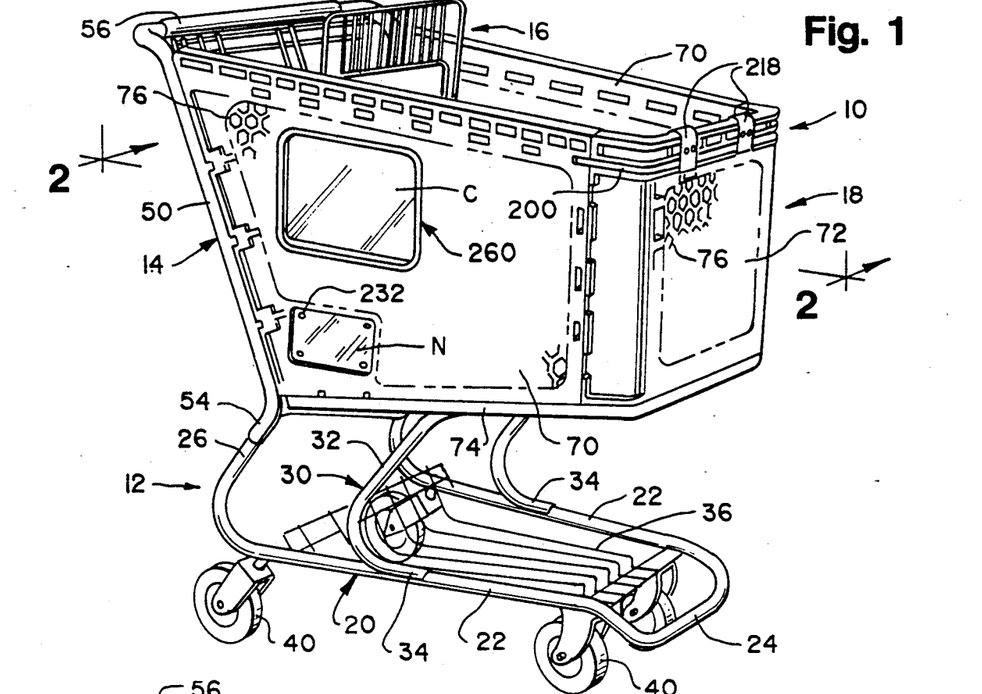
FIG. 1 is a perspective view of a shopping cart having a plastic basket and constituting a preferred embodiment of this invention.

As shown in FIG. 1 and other views, a shopping cart 10 comprising a wheeled chassis 12, a handle structure 14, a pivotable back 16, and a basket 18 of an improved construction constitutes a preferred embodiment of this invention. The basket 18 comprises separate side, front, and bottom panel members molded from a suitable plastic and assembled without any need for a basket frame.

The wheeled chassis 12 is similar to wheeled chassis used on shopping carts known heretofore, such as Model 85 Shopping Carts made and sold by Unarco Commercial Products of Oklahoma City, Okla.

The wheeled chassis 12 comprises a main frame 20 made from steel tubing bent so as to form two side portions 22 extending longitudinally at a slight angle relative to each other, a front portion 24 extending transversely from and connecting the side portions 22, two back portions 26, each extending upwardly and forwardly from one of the side portions 22 at an acute angle relative to the same side portion 22, and an intermediate portion 28 (see FIG. 3) extending transversely between the side portions 22. The intermediate portion 28 comprises welded ends of the steel tubing of the main frame 20 about midway between the side portions 22.

The wheeled chassis 12 also comprises an intermediate brace 30 made from steel tubing bent so as to form two side portions 32, each being welded to one of the side portions 22 of the main frame 20 at a lower, saddle-shaped end 34, and an upper, transverse portion 36 connecting the side portions 32 and extending transversely beneath the transverse portion 28 of the main frame 20. The transverse portion 36 of the intermediate brace 30 is disposed beneath the transverse portion 28 of the main frame 20 and is welded to such portion 28. Moreover, the wheeled chassis 12 comprises a welded wire shelf 38 mounted to the main frame 20, between the side portions 22. Four casters 40 are mounted beneath the side portions 22 in a known manner.

Figure 2:
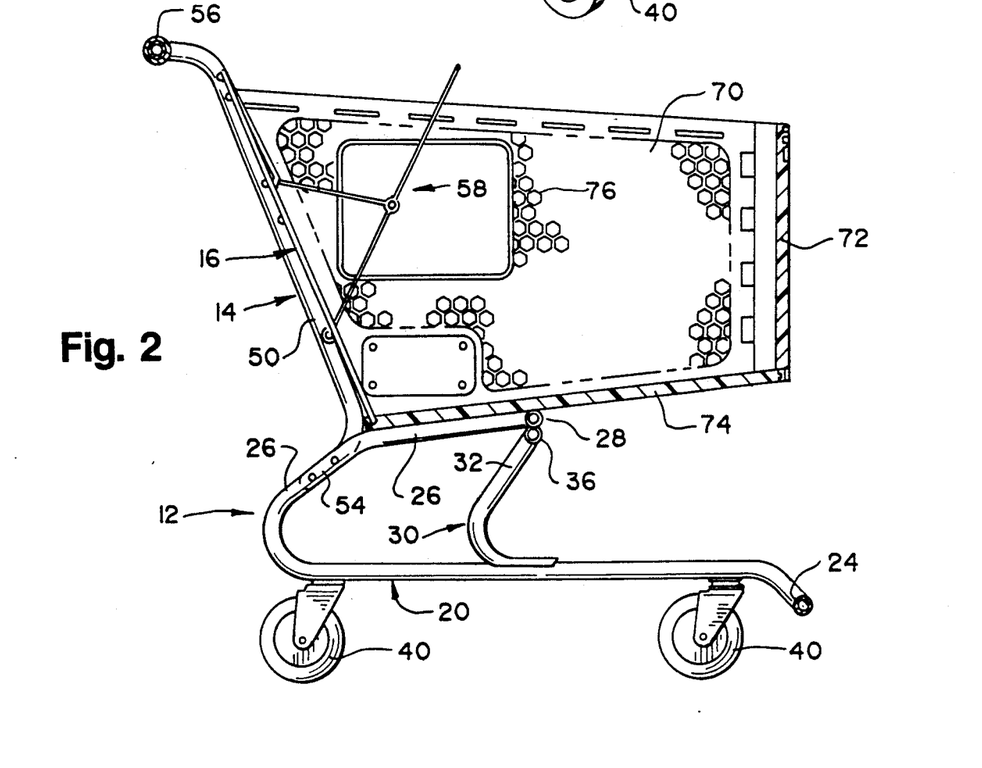
FIG. 2 is a sectional view taken along line 2—2 of FIG. 1, in a direction indicated by arrows.
Figure 3:
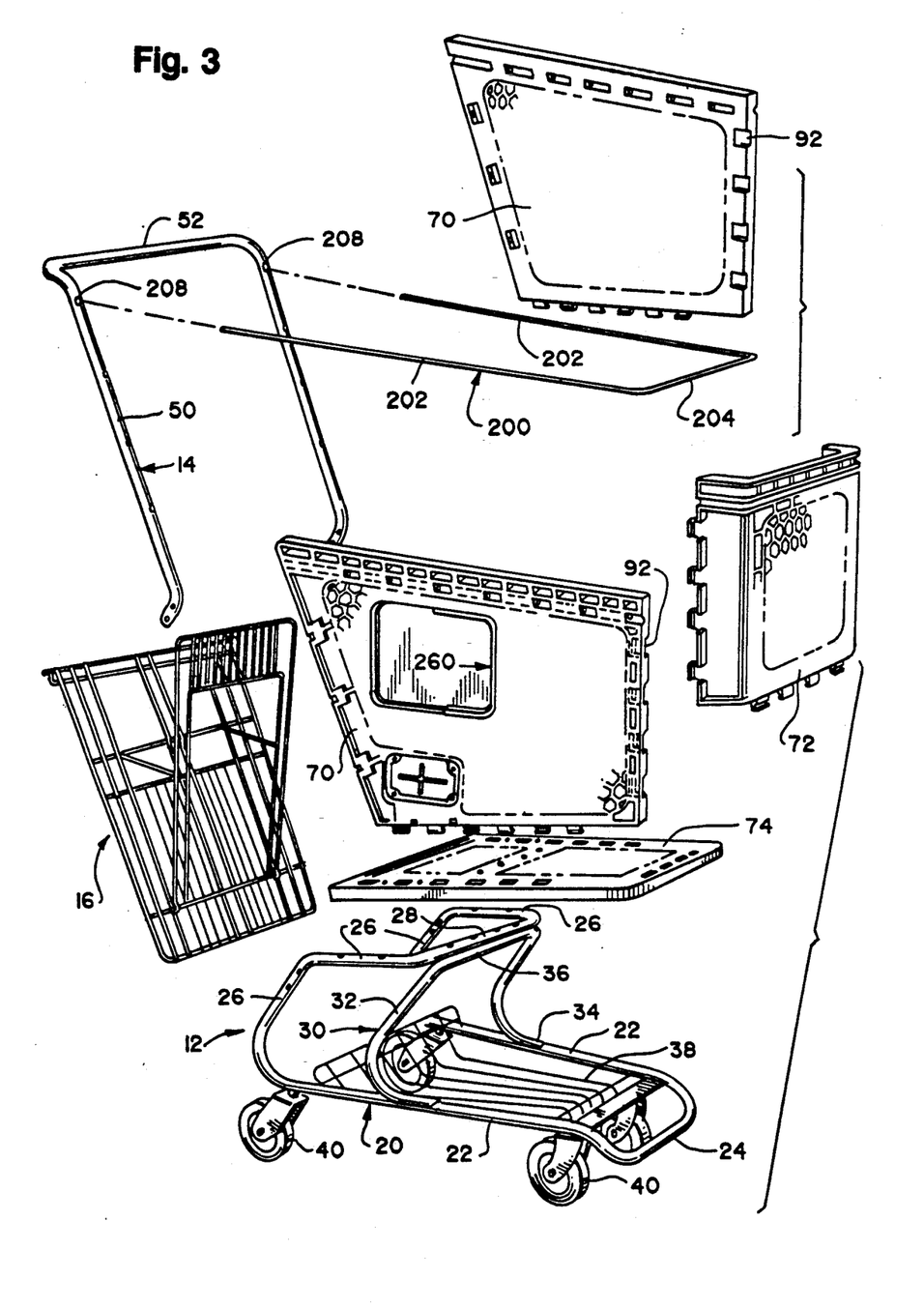
FIG. 3 is an exploded, perspective view of the shopping cart.

As shown in FIG. 3, the handle structure 14 is made from steel tubing bent to form two upright portions 50 and a transverse portion 52 connecting the upright portions 50 at their upper ends. As shown in FIGS. 1 and 2, each of the upright portions is riveted to one of the back portions 26 of the main frame 20 of the wheeled chassis 12, at a lower, saddle-shaped end 54. A plastic grip 56, which may bear advertising or other indicia, is mounted on the transverse portion 54 in a known manner. The plastic grip 56 is omitted in FIGS. 3, 23, and 24 so as to show the transverse portion 52. The upright portions 50 may be conveniently referred to as the handle uprights 50.

The pivotable back 16 is similar to the pivotable backs used on shopping carts known heretofore, such as Model 85 Shopping Carts made and sold by Unarco Commercial Products of Oklahoma City, Okla. At its upper edge, on each side, the pivotable back 16 is mounted pivotally to the handle uprights 50 so as to be upwardly pivotable when a similar cart (not shown) is nested with the shopping cart 10. The pivotable back 16 is manipulatable either to provide a baby seat 58, as shown in FIG. 2, or to fold backwardly so as to be substantially coplanar with the handle uprights 50. Further structural and functional details of the pivotable back 16 are outside the scope of this invention and can be readily supplied by persons having ordinary skill in the art.

The plastic basket 18 is riveted to the handle uprights 50 and to the transverse portion 28 of the main frame 20 of the wheeled chassis 12 in a manner to be later described. The plastic basket 18 comprises two side panel members 70, a front panel member 72, and a bottom panel member 74, each being molded from a suitable plastic. The side and front panel members have extensive patterns of hexagonal holes 76. The bottom panel member 74 has extensive patterns of square holes 78. These patterns of holes reduce the overall weight of the panel members and permit visual access to the basket interior. Although hexagonal holes are preferred for the side and front panel members, square, diamond-shaped, or differently shaped holes may be alternatively used. A preferred material for molding the panel members is high density polyethylene. An alternative material therefor is polyurethane.

Figures 4, 5, 6:
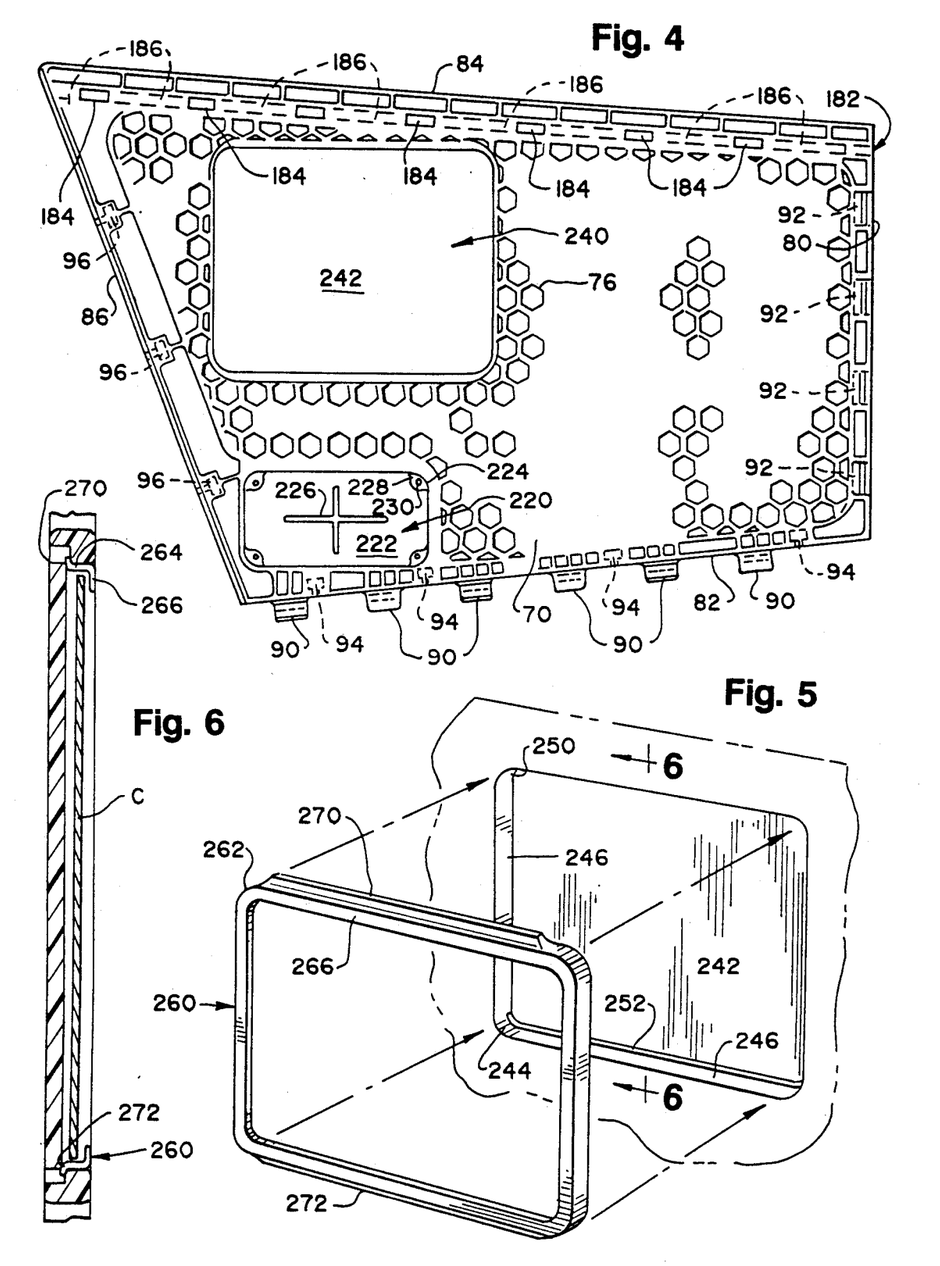
FIG. 4, on a somewhat larger scale, is a side elevation of a side panel member of the plastic basket, apart from the chassis and handle structure of the shopping cart.
FIG. 5 is a fragmentary, exploded, perspective view of a portion of the side panel member, along with an outer, removable frame attachable thereto.
FIG. 6, on a slightly larger scale, is a sectional view taken along line 6—6 of FIG. 5, in a direction indicated by arrows, with portions of the outer frame attached thereto and shown in phantom lines.

As shown in FIG. 4, each side panel member 70 is generally quadrilateral with a front edge 80 extending vertically, a bottom edge 82 extending backwardly and downwardly from the front edge 80 at a slight angle relative to the horizontal, a top edge 84 extending backwardly and upwardly from the front edge 80 at a slight angle relative to the horizontal, and a back edge 86 sloping downwardly from the top edge 84 to the bottom edge 82 at an acute angle relative to the vertical. Each side panel member 70 has tabs 90 extending downwardly from its bottom edge 82 and slots 92 (see FIG. 15) extending backwardly into its front edge 80. Each side panel member 70 has rivet head-receiving pockets 94 spaced along its bottom edge 82 and rivet head-receiving pockets 96 spaced along its back edge 86. Each such pocket has a hole extending downwardly or backwardly therefrom.

Figure 9:
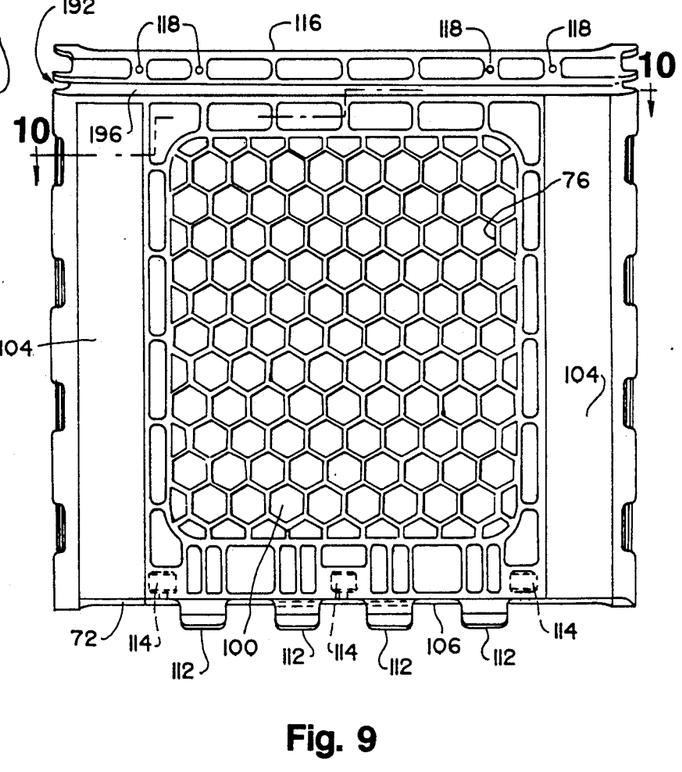
FIG. 9 is a front elevation of a front panel member of the plastic basket, apart from the chassis and handle structure.
Figure 10:
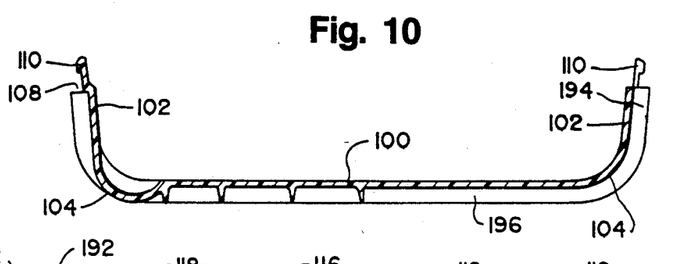
FIG. 10 is a sectional view taken along line 10—10 of FIG. 9, in a direction indicated by arrows.
Figure 11:
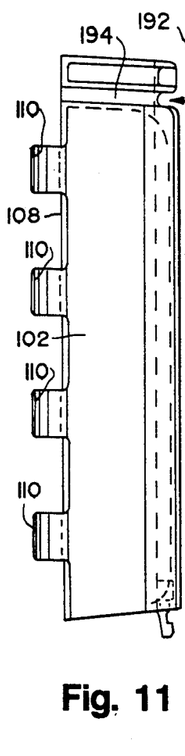
FIG. 11 is a side elevation of the front panel member, as taken from the left side of FIG. 9.

As shown in FIGS. 9, 10, and 11, the front panel member 72 is generally U-shaped with a planar portion 100, which is generally rectangular, two side portions 102, which flare backwardly from the planar portion 100, and curved corner portions 104 between the side and planar portions. The planar portion 100 has a bottom edge 106 extending transversely. Each side portion 102 has a back edge 108 extending vertically. The front panel member 72 has tabs 110 extending backwardly from the back edge 108 of each side portion 102 and tabs 112 extending downwardly from the bottom edge 106 of the planar portion 100. The planar portion 100 has rivet head-receiving pockets 114 spaced along the bottom edge 106. Each pocket 114 has a hole extending downwardly therefrom. Also, near a top edge 116 of the front panel member 72, two pairs of rivet holes 118 are provided.

Figure 7:
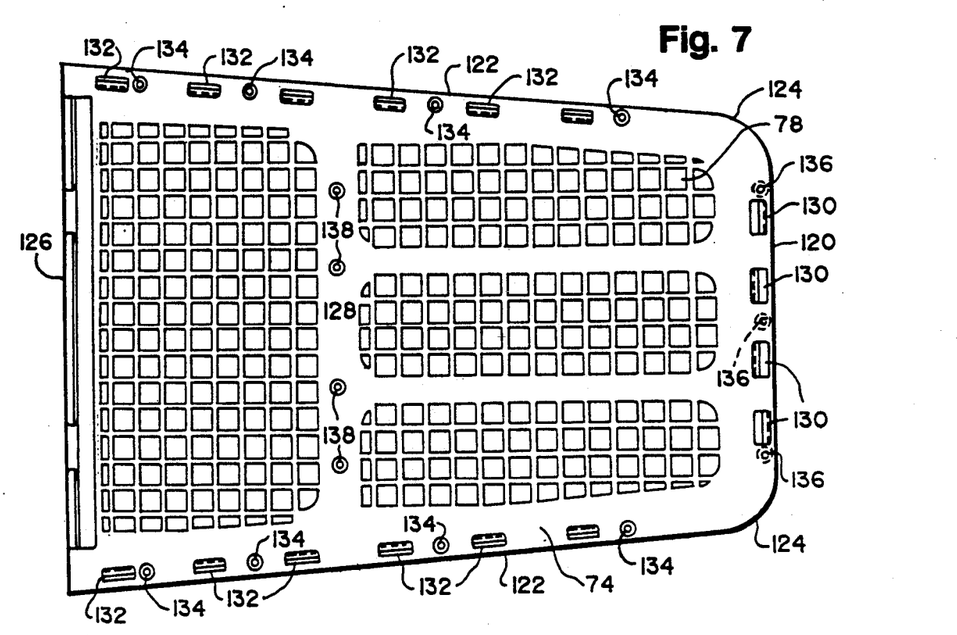
FIG. 7 is a top elevation of a bottom panel member of the plastic basket, apart from the chassis and handle structure noted above.
Figure 8:
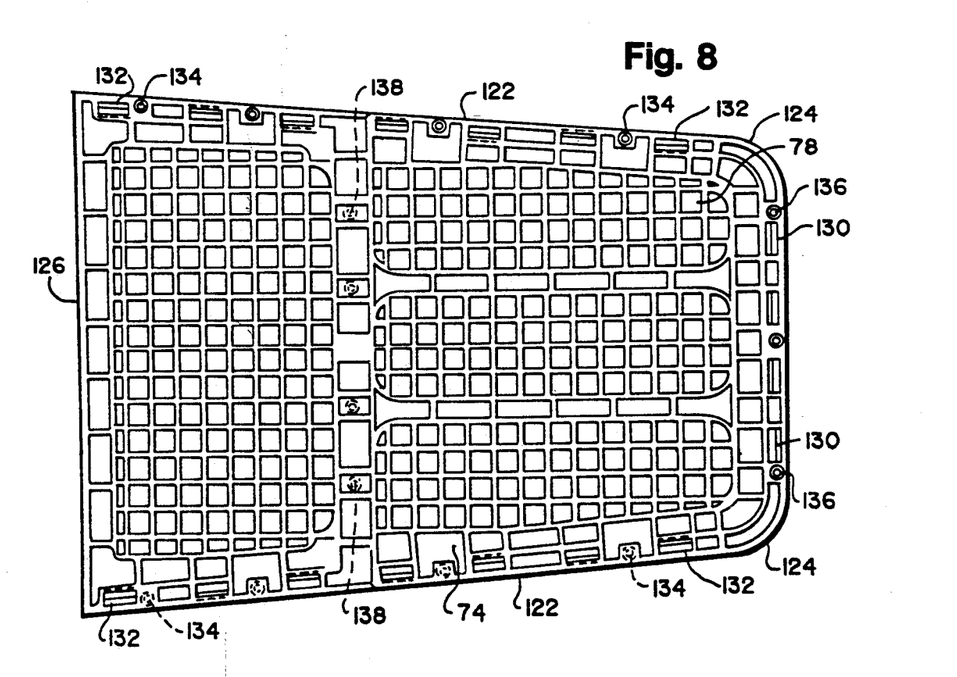
FIG. 8 is a bottom elevation of the bottom panel member, apart from the chassis and handle structure noted above.

As shown in FIGS. 3, 7, and 8, the bottom panel member 74 is generally quadrilateral with a front edge 120 extending transversely, two side edges 122 flaring backwardly and connected to the front edge 120 by curved corner edges 124, and a back edge 126 extending transversely and parallel to the front edge 120. The bottom panel member 74 has a wide strip portion 128 extending transversely where the bottom panel member 74 overlies the transverse portion 28 of the main frame 20 of the wheeled chassis 12. The bottom panel member 74 has slots 130 extending downwardly thereinto, near the front edge 120, and slots 132 extending downwardly thereinto, near each of the side edges 122. The bottom panel member 74 has rivet holes 134 spaced along each side edge 122, rivet holes 136 spaced along the front edge 120, and rivet holes 138 spaced along the wide strip portion 128.

Figures 18, 19, 20, 21:
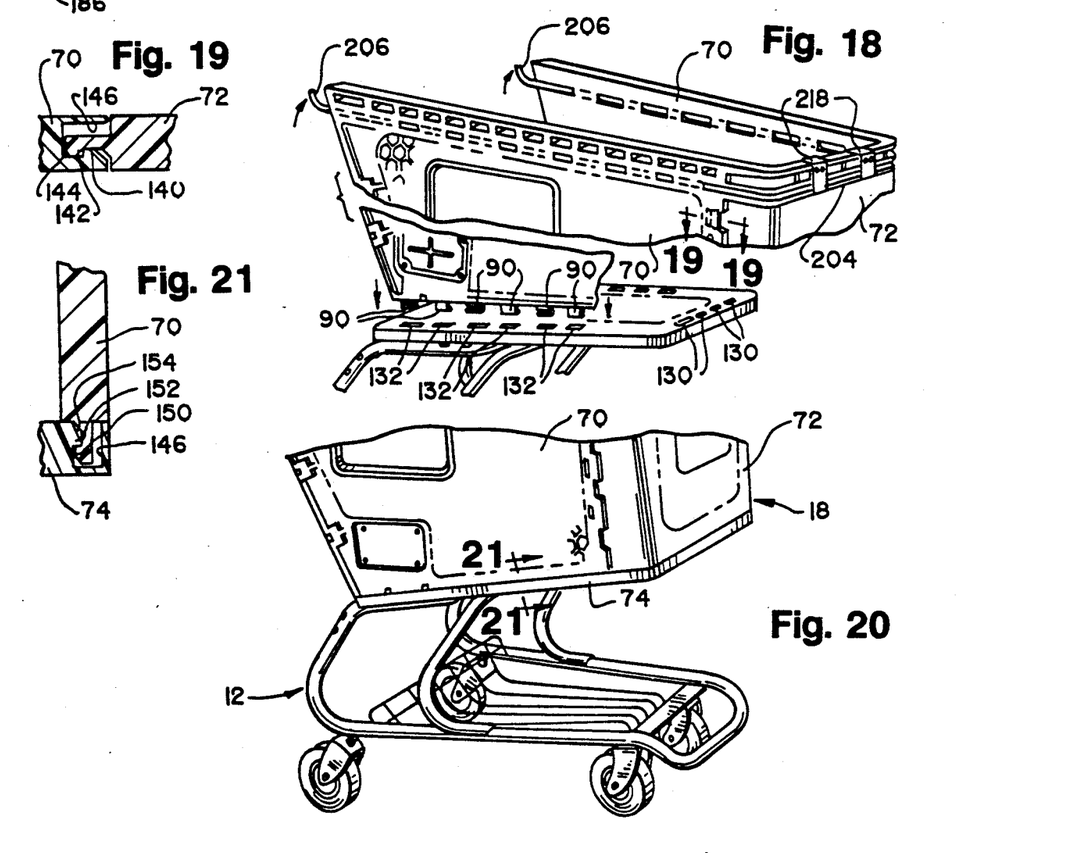
FIG. 18 is a fragmentary, perspective view of the plastic basket and the wheeled chassis in a yet later stage in the assembly of the shopping cart.
FIG. 19 is a fragmentary, sectional detail taken along line 19—19 of FIG. 18, in a direction indicated by arrows.
FIG. 20 is a fragmentary, perspective view of the plastic basket and the wheeled chassis in a still later stage in the assembly of the shopping cart.
FIG. 21 is a fragmentary, sectional detail taken along line 21—21 of FIG. 20, in a direction indicated by arrows.

As exemplified in FIGS. 19 and 21, each of the tabs 90, 110, 112, has a groove 140 defining a hooked end 142 with a chamfer 144, and each of the slots 92, 130, 132, is defined by a straight wall 146 and by an opposite, grooved wall having a groove 150 defining a hooked end 152 with a chamfer 154. Thus, when the panel members are assembled, the hooked end 142 of each tab is interengaged with the hooked end 152 of the grooved wall of the slot receiving such tab.

Alternate ones of the tabs 90 extending from the bottom edge 82 of each side panel member 70 are oriented so that the grooves 140 thereof face outwardly, whereas the other tabs 90 extending therefrom are oriented so that the grooves 140 thereof face oppositely.

As shown in FIGS. 7 and 8, the respective slots 132 near the side edges 122 of the bottom panel member 74 are oriented so that the grooves 150 of the grooved walls thereof face the grooves 140 of the respective tabs 90 received by such slots 132.

Two outer tabs 112 extending from the bottom edge 106 of the planar portion 100 of the front panel member 72 are oriented so that the grooves 140 thereof face outwardly, i.e. forwardly, whereas the other tabs 112 extending therefrom are oriented so that the grooves 140 thereof face oppositely. The respective slots 130 near the front edge 120 of the bottom panel member 74 are oriented so that the grooves 150 of the grooved walls thereof face the grooves 140 of the respective tabs 112 received by such slots 130.

Figures 15, 16, 17:
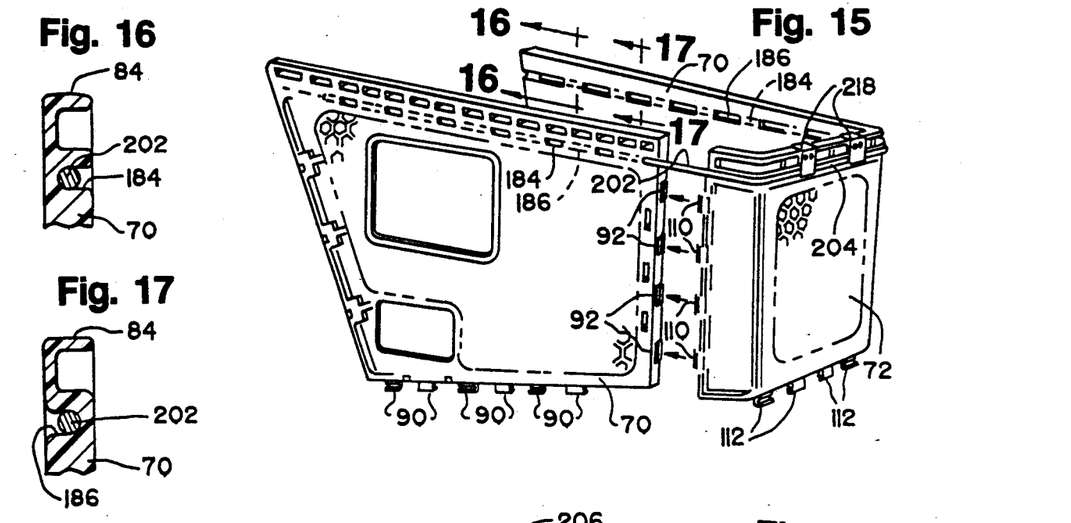
FIG. 15 is a perspective view of the same components and two side panel members of the plastic basket in a later stage in their assembly.
FIG. 16 is a fragmentary, sectional detail taken along line 16—16 of FIG. 15, in a direction indicated by arrows.
FIG. 17 is a fragmentary, sectional detail taken along line 17—17 of FIG. 15, in a direction indicated by arrows.

As shown in FIGS. 4, 15 and other views, a portion along the top edge 84 of each side panel member 70 has a wire-receiving formation 182, which comprises relatively short, outwardly opening channels 184 and relatively long, inwardly opening channels 186. The inwardly opening channels 184 alternate with the outwardly opening channels 186 along the top edge portions 180 of the side panel members 70. Moreover, a portion along the top edge 116 of the front panel member 72 has an outwardly opening channel 192, which has a side portion 194 where the channel 192 extends along each of the side portions 102 and a front portion 196 where the channel 192 extends along the planar portion 100.

Figure 13:
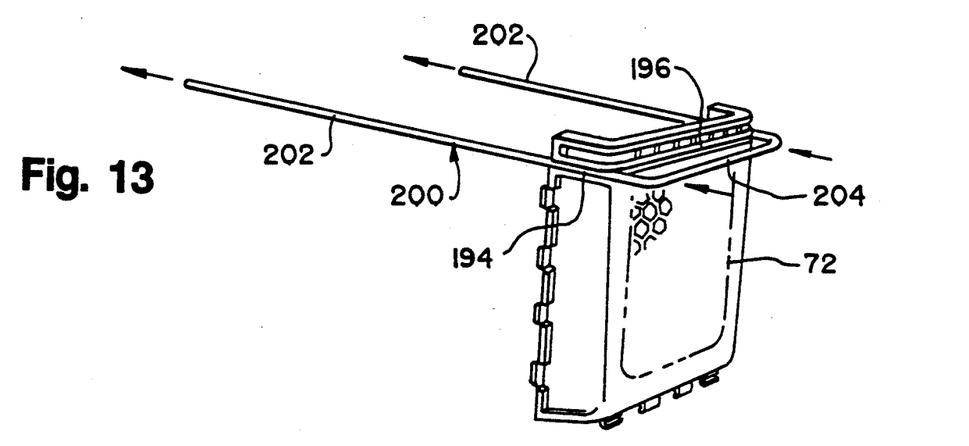
FIG. 13 is a perspective view of a front panel member of the plastic basket and a rim wire in one stage in the assembly of the shopping cart.
Figure 14:
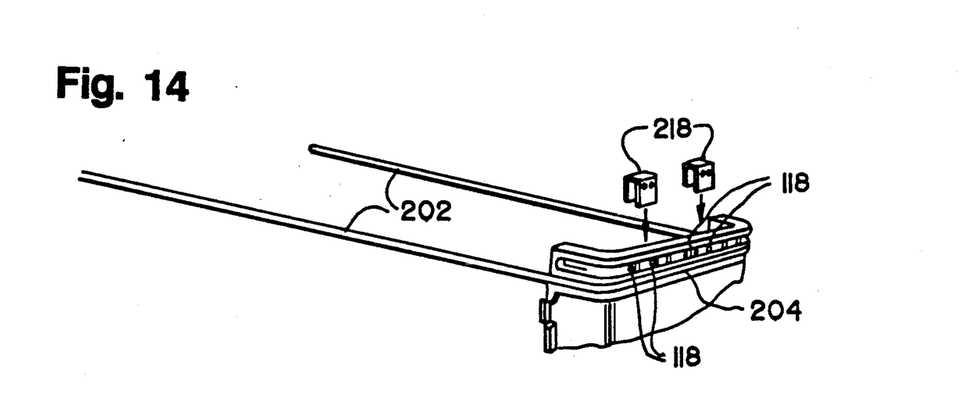
FIG. 14 is a fragmentary, exploded, perspective view of the front panel member, the rim wire, and two retaining clips in a later stage in the assembly of the shopping cart.

As shown in FIGS. 3, 13, 14, and other views, the basket 18 comprises a U-shaped rim wire 200, which is a length of steel wire bent so as to have two side portions 202 and a bight portion 204 connecting the side portions 202. After the plastic basket 18 has been assembled in a manner to be later described, the side portions 202 of the rim wire 200 extend along the side portions 194 of the channel 192 of the front panel member 72, and through the channels defining the wire-receiving formations 182 of the side panel members 70, and the bight portion 204 is received by the front portion 196 of the channel 192 of the front panel member 72. Thus, the side portions 202 are received by the wire-receiving formations 182, and the bight portion 204 bears against the front panel member 72.

The shopping cart 10 is shown in various stages in its assembly in FIGS. 12 through 22. The wheeled chassis 12 is preassembled in a known manner.

Figure 12:
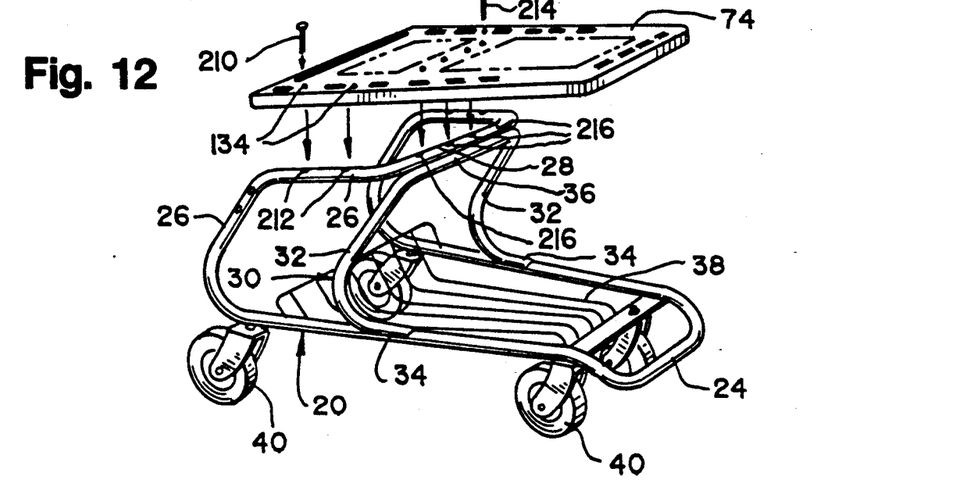
FIG. 12 is an fragmentary, exploded, perspective view of a lower panel member of the plastic basket and a wheeled chassis of the shopping cart in one stage in the assembly of the shopping cart.

Initially, as shown in FIG. 12, the bottom panel member 74 is riveted to the main frame 20 of the wheeled chassis 12 by rivets 210 (one shown) utilizing the back two holes 134 along each side edge 122 of the bottom panel member 74 and aligned holes 212 in the main frame 20 and by rivets 214 (one shown) utilizing the rivet holes 138 along the wide strip portion 128 of the bottom panel member 74 and aligned holes 216 in the main frame 20. Moreover, as shown in FIG. 13, the rim wire 200 is mounted to the front panel member 72 so that the side portions 202 of the rim wire 200 are passed through the side portions 194 of the outwardly opening channels 192 of the front panel member 72, until the bight portion 204 of the rim wire 200 enters the front portion 196 of such channel. As shown on FIG. 14, two retaining clips 218 are used to secure the rim wire to the front panel member 72, to which the retaining clips 218 are riveted via the rivet holes 118 near the top edge 116.

Thereupon, as shown in FIG. 15, the rim wire 200 is mounted to the side panel members 70 so that the side portions 202 of the rim wire 200 are passed through the wire-receiving formations 182 comprised of the channels 184, 186, at the top edge portion 180 of the side panel members 70. Next, as shown in FIG. 18, the tabs 110 along the side portions 102 of the front panel member 72 are snapped into the slots 92 along the front edges 80 of the side panel members 70. Also, where extended backwardly from the wire-receiving formations 182, the ends of the side portions 202 of the rim wire 200 are bent upwardly to form two prongs 206.

Next, the side panel members 70 and the front panel member 72 are mounted to the bottom panel member 74 by snapping the tabs 90 along the bottom edges 82 of the side panel members 70 into the slots 132 along the side edges 122 of the bottom panel member 74, and by snapping the tabs 112 along the bottom edge 106 of the planar portion 100 of the front panel member 72 into the slots 130 along the front edge 120 of the bottom panel member 74. Thereupon, the side panel members 70 and the front panel member 72 are riveted to the bottom panel member 74 by rivets (not shown) utilizing the pockets 94 along the bottom edges 82 of the side panel members 70 and the remaining holes 134 along each side edge 122 of the bottom panel member 74 and by rivets (not shown) utilizing the pockets 114 along the bottom edge 106 of the planar portion 100 of the front panel member 72 and the holes 136 along the front edge 120 of the bottom panel member 74.

Figure 22:
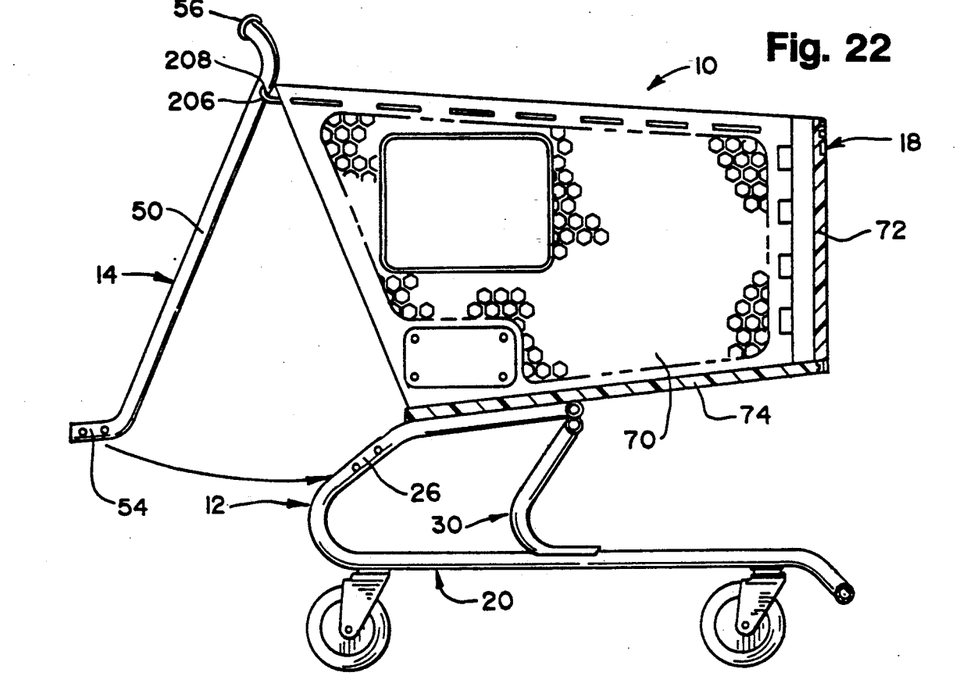
FIG. 22 is an elevational view showing a handle structure being attached in a later stage in the assembly of the shopping cart.

Thereupon, as shown in FIG. 22, the handle structure 14 is placed on the basket 18 by inserting each of the two prongs 206 into an aperture 208 in one of the handle uprights 50, and by pivoting the handle structure 14 downwardly until the lower ends 54 of the handle uprights 50 meet the main frame 20 of the wheeled chassis 12. Next, the handle uprights are riveted to the side panel members 70 by rivets (not shown) using the pockets 96 along the back edges 86 of the side panel members 70. Also, the lower ends 54 of the handle uprights 50 are riveted to the main frame 20.

Figure 23:
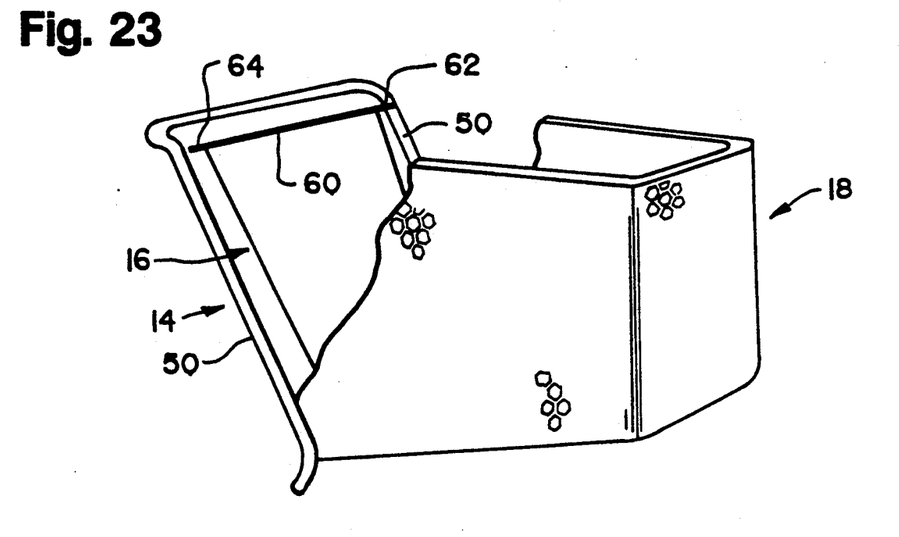
FIG. 23 is a simplified, fragmentary view showing a pivotable lock being mounted to the handle structure, in a final stage in the assembly of the shopping cart.
Figure 24:
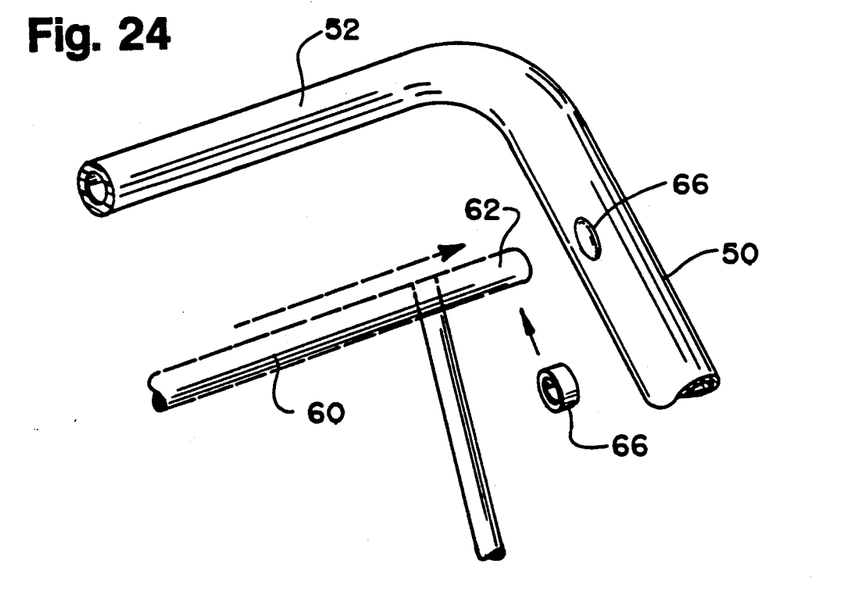
FIG. 24 is an enlarged, exploded detail taken from FIG. 23.

Finally, as shown in FIGS. 23 and 24, the pivotable back 16 is attached to the handle uprights 50. The pivotable back 16 comprises an upper, transverse wire 60, which has two ends of unequal lengths. The end 62 is longer than the end 64. The longer end 62 is inserted into an aperture 66 in one of the handle uprights 50 with a transverse movement of the wire 60, as suggested in FIG. 24, so as to provide sufficient clearance for the shorter end 64 to be then inserted into an aperture (not shown) in the other upright So with an opposite, transverse movement of the wire 60. Thereupon, the pivotable back 16 is centered between the handle uprights 50, and a split sleeve 68 is forced over the longer end 62 so as to prevent the ends 62, 64, from being removed accidentally from such apertures of the handle upright 50.

As shown in FIG. 4, each side panel member 70 has a relatively small, generally rectangular recess 220 near its bottom and back edges. The recess 220 has a planar wall 222, four rounded corners 224, a raised, cross-shaped, generally centered formation 226, and raised corner formations 228. Each corner formation 228 has a hole 230 extending through the side panel member 70. As shown in FIG. 1, the recess 220 is adapted to receive a generally rectangular nameplate N, which is secured to the side panel by conventional rivets 232 extending through the holes 230. The generally centered formation 226 protects the nameplate N against being dented easily. The nameplate N is useful to display the name of a retailer providing the shopping cart 10 to its customers for their use while shopping.

As shown in FIGS. 4, 5, and 6, each side panel member 70 has a relatively large, generally rectangular recess 240 near its top and back edges. The recess 240 has a planar wall 242, four rounded corners 244, and four peripheral walls 246. Also, the recess 240 has two elongate slots, namely a top slot 250 extending along a top edge of the recess 240 and a bottom slot 252 extending along a bottom edge of the recess 240. For each side panel member 70, a generally rectangular frame 260 is provided, which is molded from a plastic material. A preferred material for the frame 260 is high density polyethylene, which can be resiliently flexed. An alternative material therefor is polyurethane. The frame 260 has four rounded corners 262 and four peripheral walls 264 and is shaped to fit snugly within the rounded corners 244 and the peripheral walls 246 of the recess 240. Also, the frame 260 has four retaining walls 266, which extend inwardly from the peripheral walls 264. The frame 260 has two elongate tabs, namely a top tab 270 and a bottom tab 272. Because the frame 260 has a symmetrical shape, it is arbitrary to designate one such tab as the top tab 270 and the other tab 272 as the bottom tab.

When the frame 260 is fitted into the recess 240, as shown in FIG. 6, the frame 260 is flexed sufficiently to permit the top tab 270 to be inserted into the top slot 250 and the bottom tab 272 to be inserted into the bottom slot 252. Thus, the frame 260 is adapted to retain an advertising card C of a cardboard or plastic material, between the retaining walls 242 of the frame 260 and the planar wall 242 of the recess 240. The frame 260 can be easily removed and refitted so as to permit the advertising card C to be easily replaced.

Figure 25:
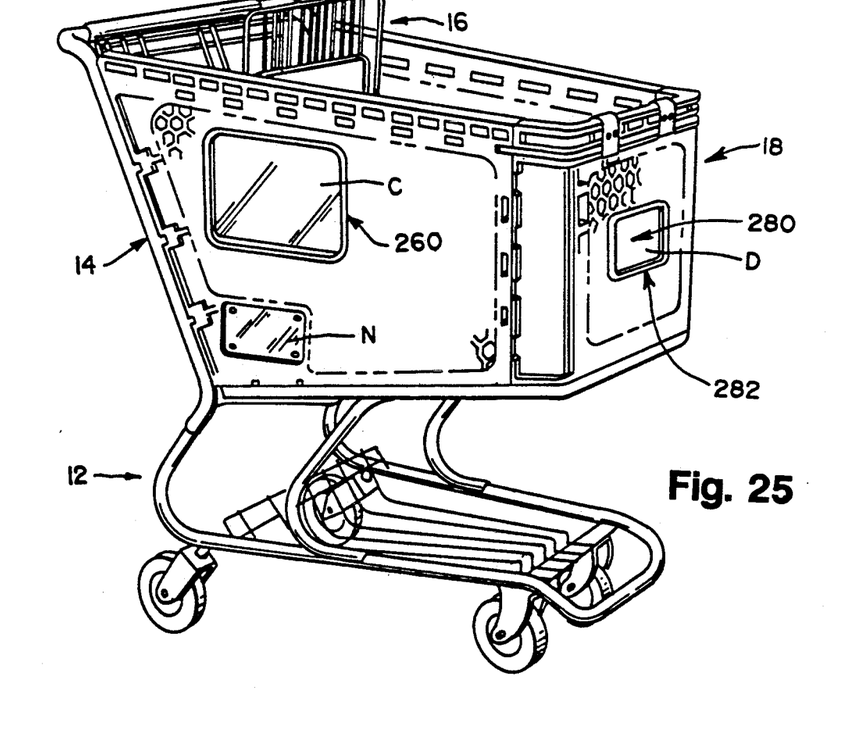
FIG. 25 is a perspective view similar to FIG. 1 but showing a modification of the front panel member of the plastic basket, in alternate embodiment of this invention.

As shown in FIG. 25, the planar portion 100 of the front panel member 72 may be optionally provided with a similar recess 280, into which a similar frame 282 may be similarly fitted to hold an advertising card D of a cardboard or plastic material.

Various modifications may be made in the preferred embodiment described above without departing from the scope and spirit of this invention.

We claim:

1. A basket comprising separate panel members molded from plastic material, said panel members consisting of two side panel members, a front panel member, and a bottom panel member, said front panel member being generally U-shaped so as to define a planar portion and two side portions, each of said side portions being generally parallel with one of said side panel members, certain of the side, front and bottom panel members having spaced tabs thereon and certain of the side, front, and bottom panel members having spaced slots therein, the spacing between the tabs corresponding to the spacing between the slots and the tabs being received by the slots to rigidly assemble and interlock the side panel members to the front panel member and to rigidly assemble and interlock the front panel member to the bottom panel member, said front and side panel members having a top edge, member-receiving formations extending along the top edge of said side panel members, a U-shaped member being received by the member-receiving formations, the U-shaped member having a bight portion and connecting the side portion and side panel members and bearing against a top edge portion of the front panel member.

2. The basket of claim 1 wherein said tabs include tabs on side edges of the front panel member and tabs on bottom edges of the side panel members, said slots including slots in the bottom panel member receiving the tabs on bottom edges of the side panel members and slots in front edges of the side panel members receiving the tabs on side edges of the front panel member.

3. The basket of claim 2 wherein said tabs include tabs on a bottom edge of the front panel member, said slots including slots in the bottom panel member receiving the tabs on the bottom edge of the front panel member.

4. The basket of claim 1 wherein each tab has a groove defining a hooked end and each slot has a wall having a groove defining a hooked end, the tabs being received by the slots such that the hooked ends defined by the grooves of the tabs and the hooked ends defined by the grooves of the walls of the slots interengage.

5. The basket of claim 4 wherein said tabs include a plurality of spaced tabs on a bottom edge of each side panel member, said slots including a plurality of spaced slots near each side edge of the bottom panel member receiving the tabs on the bottom edges of the side panel members, alternate ones of the tabs on the bottom edge of each side panel member being oriented so that the grooves face outwardly and the other tabs on the bottom edge of each side panel being oriented so that the grooves face oppositely, the grooves of the respective slots near each side edge of the bottom panel member facing the grooves of the respective tabs received thereby.

6. The basket of claim 5 wherein said tabs include a plurality of spaced tabs on a bottom edge of the front panel member, said slots including a plurality of spaced slots near a front edge of the bottom panel member receiving the tabs on the bottom edge of the front panel member, alternate ones of the tabs on the bottom edge of the front panel member being oriented so that the grooves face outwardly and the other tabs on the bottom edge of the front panel member facing oppositely, the grooves of the respective slots near the front edge of the bottom panel member facing the grooves of the respective tabs received thereby.

7. The basket of claim 1 wherein said member is a rim wire.

* * * * *